March 6, 1956
W. B. BOAST ET AL
2,737,626
PHASE-SHIFTING TRANSFORMER
Filed July 8, 1952
2 Sheets-Sheet 1
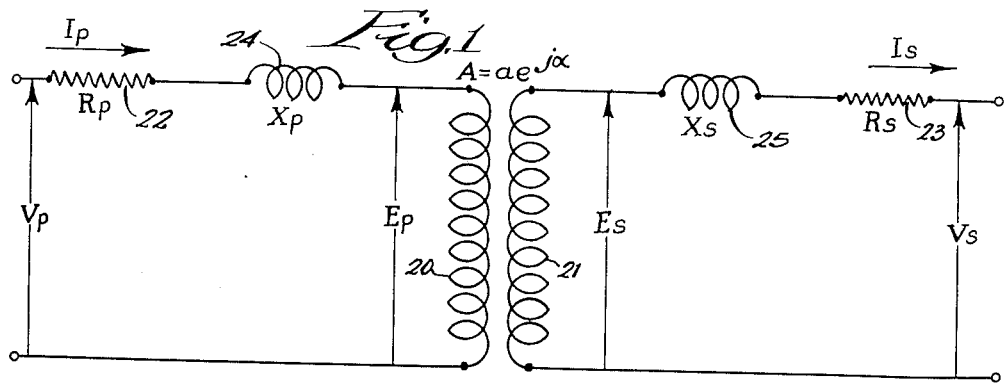
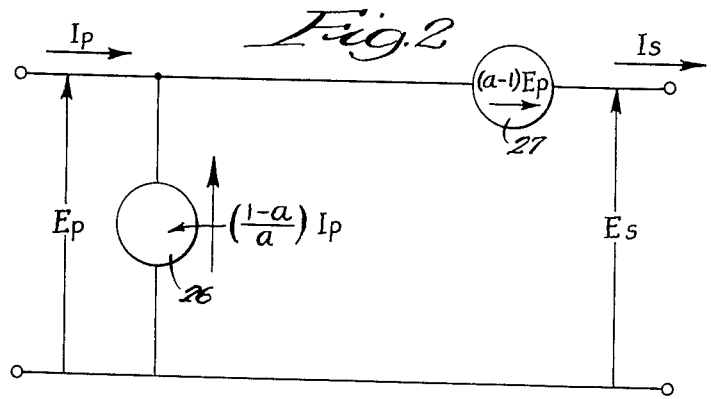
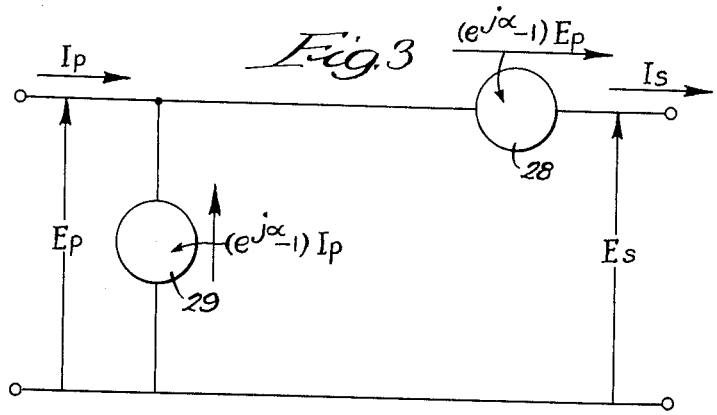
INVENTORS:
Warren B. Boast and
James E. Iske,
BY Dawson & Onus,
ATTORNEYS.

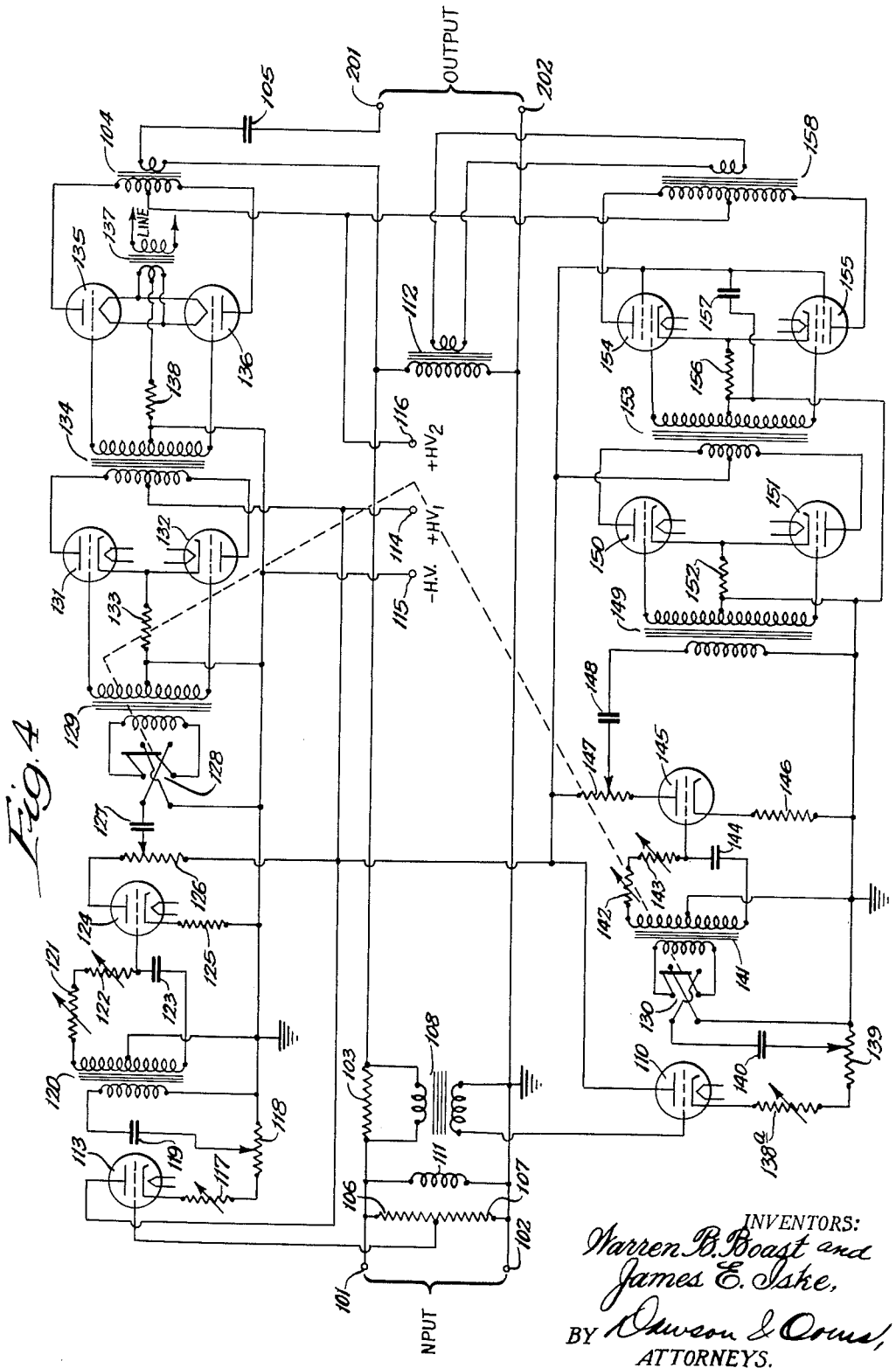

United States Patent Office 2,737,626
Patented Mar. 6, 1956

2,737,626

PHASE-SHIFTING TRANSFORMER

Warren B. Boast, Ames, Iowa, and James E. Iske, Bartlesville, Okla., assignors to Iowa State College Research Foundation, Inc., Ames, Iowa, a corporation of Iowa Application July 8, 1952, Serial No. 297,728

11 Claims. (Cl. 323—112)

This invention relates to a phase-shifting transformer; more specifically, it relates to electronic apparatus operative simultaneously to shift the phase of both the voltage and the current in a given alternating-current circuit by a predetermined angle.

The invention under consideration is particularly useful as part of a network analyzer or other test apparatus adapted for the study and analysis of complicated A.-C. networks.

Frequently, in the analysis of complicated circuit problems, it is desirable to have a compact four-terminal "box" which can be caused to change by a predetermined amount the magnitude and phase of the voltage and current at its respective input and output terminals. Such a "box," if available, can be preadjusted to possess the electrical characteristics of an actual circuit element, which may in reality be very complicated. Thus, the "box" might simulate in a single-phase network the equivalent of an actual three-phase phase-shifting network of transformers.

Conventional electrical art provides, in the ordinary iron-core transformer, a device which may be used to change the magnitude of voltages and currents, without affecting their phase. The present invention is directed primarily to providing an electronic device adjustable to provide controlled simultaneous phase shifts of voltage and current in single-phase circuits without affecting their magnitude.

Our invention, therefore, may be connected in cascade with a conventional magnitude transformer to provide controlled transformation, as to both magnitude and phase, of the voltage and the current in an A.-C. circuit.

Furthermore, our invention may be adjusted if desired to provide in itself a complex transformation constant; that is, to shift the phase and also alter the magnitude of the voltage and current applied to it.

Of course, circuit elements to be represented for purposes of network analysis will often possess losses. Moreover, the network to be simulated may contain one or more generators. In the transformer of the present invention, such imperfections, losses, or energy sources in the simulated network may be represented either by using series and shunt resistors to simulate actual attenuation losses or by appropriate adjustment of the variable controls to be hereinafter described in detail.

For purposes of the present introductory remarks on the objects of our invention, it will suffice to say that our invention may be adjusted to act as a perfect phase transformer, or it may be adjusted to introduce both phase shifts and magnitude changes. To provide such an instrument which will operate in single-phase circuits is, in the broad sense, the object of our invention.

It is a further object of this invention to provide such a phase-shifting apparatus which will shift simultaneously the phase of the voltage and current in an A.-C. circuit without appreciably affecting the impedances therein. In other words, it is the objective of our invention to provide a phase-shifting apparatus of the type described wherein the impedance "seen" looking into the input terminals is substantially the same as that seen at the output terminals looking toward the load.

Before treating in detail the theoretical foundation of our invention and the actual circuit by which our invention is realized, we shall describe briefly the drawing which is appended hereto.

Figure 1 is a schematic diagram showing the complete equivalent circuit of an actual transformer. Fig. 2 is a schematic diagram showing an equivalent circuit in which a perfect magnitude transformer is represented by two generators, a shunt-connected current generator and a series-connected voltage generator. Fig. 3 is a similar schematic showing of the two-generator equivalent of a perfect phase transformer. Fig. 4 is a schematic diagram showing an actual apparatus conforming to the diagrammatic showing of Fig. 3.

The practical problems requiring solution by network analysis commonly arise in power-transmission work or in other fields wherein a single frequency is involved. Accordingly, the theoretical discussion which follows, and the practical circuit to be herein described, assume that all voltages and currents will be sinusoidal in wave form and possess a single, constant frequency. In conventional power work, that frequency would usually be 60 cycles per second. To permit reduction in size of the physical components required, a higher frequency, such as 10,000 cycles per second, may be used in network analyzers. It is to be understood that our invention is not limited in application to any particular frequency, but that the invention may be used for any frequency within a very wide range, provided the capacitors, inductances, etc., be appropriately chosen for the frequency to be used.

An actual transformer can be represented by the equivalent circuit shown in Fig. 1. In that figure, the primary coil 20 and the secondary coil 21 will, in practice, possess resistance and leakage reactance. The resistance of the two coils can be represented for purposes of analysis by the series resistors 22 and 23, representing respectively the resistance of the primary winding and that of the secondary winding. Similarly, the primary leakage inductance may be represented by the external series element 24, and the secondary leakage reactance can be represented by the external series element 25.

Thus the imperfections of a practical transformer can be adequately represented by external elements, and the transformer action treated as though it were taking place in a mythical "perfect transformer," represented in Fig. 1 by the coils 20 and 21.

The transformation constant A of the perfect transformer represented by coils 20 and 21 may be split into a magnitude-transformation constant $a$ and a phase-transformation constant $e^{j\alpha}$.

In Fig. 2 we have shown diagrammatically the equivalent circuit of a perfect magnitude transformer, while we have shown in Fig. 3 the equivalent circuit of a perfect phase transformer. As may be seen from Figs. 2 and 3, both types of transformation can be represented by an equivalent circuit consisting of a shunt-connected current generator and a series-connected voltage generator. Each of the constant-current generators would, in the ideal case, possess infinite internal impedance, and each of the voltage generators would possess zero internal impedance.

In both Figs. 2 and 3, the input voltage applied to the primary terminals is marked $E_p$ and the current flowing in the primary circuit is denoted $I_p$. Similarly, the voltage present at the output terminals is marked $E_s$ and the current flowing in the secondary circuit is marked $I_s$.

In the case of the magnitude transformer, as shown in

Fig. 2, the current generator 26 should deliver a current equal to $$\frac{(1-a)}{a} I_p$$

and the series voltage generator should deliver voltage equal to $(a-1)E_p$.

A brief study of Fig. 2, particularly with reference to a numerical example, will show that the equivalent circuit therein shown does in fact faithfully reproduce the behavior of a perfect magnitude transformer. For example, suppose one is representing a perfect transformer having a transformation constant of 3, with no phase shift. Suppose the primary voltage $E_p$ is 100 volts and the primary current is 1 ampere. Under those conditions, the series generator would develop a voltage equal to $2E_p$ or 200 volts and the current generator would develop a current equal to $-\frac{2}{3}I_p$ or $-\frac{2}{3}$ amperes. (The minus sign of course indicates a current of opposite phase.) The resulting secondary voltage would be 300 volts and the resulting secondary current would be ⅓ ampere, the result to be expected.

The present invention is not primarily concerned with the magnitude transformation represented by the Fig. 2 equivalent circuit. We have included that figure and described it in some detail, however, because an understanding of the equivalent circuit for magnitude transformation will assist the reader considerably in following the theory of the phase transformer represented by the equivalent circuit of Fig. 3.

In that figure it may be noted that, to accomplish a perfect phase transformation without affecting the magnitude of either the voltage or the current, the series voltage generator 28 should have a voltage equal to $(e^{j\alpha}-1)E_p$ while the shunt-current generator 29 should develop a current equal to $(e^{j\alpha}-1)I_p$.

By way of numerical example to illustrate the operation of the equivalent circuit of Fig. 3, suppose the primary voltage $E_p$ is 100 volts at 0° and the primary current is 1 ampere at 0°. The secondary voltage $E_s$ would equal $E_p(e^{j\alpha}-1+1)$ or 100 at an angle of $\alpha$. Similarly, the secondary current $I_s$ would equal $I_p(e^{j\alpha}-1+1)$ or 1 ampere at an angle of $\alpha$.

In the present invention, which is shown schematically in Fig. 4, we have provided an electronic apparatus which will function as a substantially perfect phase transformer, shifting the phase of both voltage and current by a predetermined phase angle without affecting the magnitudes of either voltage or current and without affecting appreciably the impedances "seen" either by the energy source connected to the output (secondary) terminals.

Referring now specifically to the schematic diagram of Fig. 4, we have provided a pair of input terminals 101 and 102. Input terminal 102 is grounded, while input terminal 101 is connected to output terminal 201 through the series circuit comprising resistor 103, the secondary winding of transformer 104, and capacitor 105. Resistor 103 should have very low ohmic value, so as to have negligible effect on the impedance seen at the input terminals. In a typical embodiment, resistor 103 had a resistance of one-tenth ohm. The capacitance of capacitor 105 is so chosen as to cancel the phase shift introduced by the leakage reactance of the secondary winding of transformer 104. Output terminal 202 is grounded.

Resistors 106 and 107 are connected in series across the input terminals 101 and 102. The total ohmic value of resistors 106 and 107 is very high, so as to introduce negligible change in the impedance seen at the input terminals. The relative resistances of 106 and 107 should be chosen so as to provide at their junction a suitable fraction of the voltage applied to the input terminals. In a typical embodiment, resistor 106 was 47,000 ohms and the resistance of resistor 107 was 22,000 ohms.

The primary coil of transformer 108 is connected across resistor 103; one terminal of the secondary coil of transformer 108 is grounded, and the other terminal is connected to the grid of tube 110. Inductor 111 is connected across input terminals 101 and 102, its purpose being to develop parallel resonance with the inter-winding capacitance of transformer 108, thus reducing to a negligible value the loading effect of transformer 108.

The secondary winding of transformer 112 is connected between ground and the junction of resistor 103 and the secondary winding of transformer 104. Transformer 112 will be a transformer presenting a very high impedance at its secondary terminals.

The junction of resistors 106 and 107 is connected to the grid of tube 113. The plate of tube 113 is connected to a suitable positive voltage source 114, the negative terminal 115 thereof being grounded. Terminal 115 also represents the negative terminal of the second high-voltage source 116 to be referred to specifically in a later paragraph hereof.

The cathode of tube 113 is connected to ground through a series circuit comprising variable resistor 117 and potentiometer 118. The movable contact on potentiometer 118 is connected through coupling capacitor 119 to one terminal of the primary coil of transformer 120. The other terminal of the primary coil of transformer 120 is grounded.

The secondary coil of transformer 120 is center-tapped, the center tap being grounded. The secondary terminals of transformer 120 are bridged by a series circuit comprising variable resistor 121, variable resistor 122, and capacitor 123. The junction of resistor 122 and capacitor 123 is connected to the grid of tube 124.

The cathode of tube 124 is connected to ground through resistor 125, and the plate of tube 124 is connected to high-voltage terminal 114 through potentiometer 126.

The particular values of the capacitors and resistors just described will normally be determined in part by the types of tubes used and in part by the frequency of the input signal. In a typical embodiment designed for use at 10,000 cycles per second, resistor 117 had a maximum value of 1,500 ohms, resistor 118 a maximum value of 2,000 ohms, capacitor 119 a capacitance of .01 mf., capacitor 123 a capacitance of .002 mf., resistor 122 a maximum value of 30,000 ohms, and resistor 121 a maximum value of 15,000 ohms. In the same typical embodiment, resistor 125 was 2,000 ohms and potentiometer 126, 30,000 ohms.

The adjustable tap on potentiometer 126 is connected through coupling capacitor 127 to diagonally opposite terminals of a double-pole double-throw switch 128, the other pair of opposite terminals being grounded. The movable arms of switch 128 are connected across the primary coil of transformer 129.

Normally a suitable mechanical ganging arrangement, schematically indicated on Fig. 4, will be provided for convenient simultaneous operation of switch 128 and of switch 130, to be described hereinafter. Persons familiar with the art will see at once that switch 128 is connected as a phase-reversing switch. In the aforesaid typical embodiment capacitor 127 had a capacitance of .01 mf.

The secondary winding of transformer 129 is center-tapped, the center tap being grounded. The cathodes of tubes 131 and 132 are connected together and connected to ground through biasing resistor 133, which in the typical embodiment aforesaid had a resistance of 1,000 ohms. The secondary terminals of transformer 129 are connected respectively to the grid of tube 131 and the grid of tube 132.

The plates of tubes 131 and 132 are respectively connected to the primary terminals of transformer 134, the center tap of which is connected to high-voltage terminal 114.

The secondary winding of transformer 134 is center-tapped, the center tap being grounded. The secondary terminals of transformer 134 are connected respectively to the grid of tube 135 and the grid of tube 136. The heaters of tubes 135 and 136, which in the illustrated embodiment are of the filament type, are connected across the secondary winding or transformer 137, the primary winding thereof being connected to a suitable source of alternating current, such as a conventional 115 volt power line. The center tap of the secondary winding of transformer 137 is connected to ground through biasing resistor 138, which, in the illustrated embodiment, had a value of 800 ohms.

Incidentally, we have not shown in Fig. 4 any voltage source for energizing the heaters of the indirectly heated tubes shown in the drawing. It will be understood that, as is conventional, such heaters are energized in any suitable manner, as by a step-down transformer.

The plates of tubes 135 and 136 are connected respectively to the terminals of the primary coil of transformer 104, the center tap of that coil being connected to high-voltage terminal 116.

The cathode of tube 110 is connected to ground through the series circuit comprising variable resistor 138a and potentiometer 139. In the aforesaid typical embodiment, resistor 138a had a maximum value of 1,500 ohms and resistor 139 a maximum value of 2,000 ohms. The movable tap on potentiometer 139 is connected through coupling capacitor 140 to a pair of diagonally opposite terminals of double-pole double-throw switch 130, heretofore mentioned. The other pair of diagonally opposite terminals are grounded. The movable arms of switch 130 are connected to the respective primary terminals of transformer 141. As may be readily seen from Fig. 4, switch 130 is also connected as a phase-reversing switch.

The secondary winding of transformer 141 is center-tapped, the center tap being grounded. The secondary terminals of transformer 141 are bridged by a series circuit comprising variable resistor 142, variable resistor 143, and capacitor 144. Generally speaking, the values assigned to elements 142, 143, and 144 will be respectively similar to those given resistors 121, 122, and 123.

The junction of resistor 143 and capacitor 144 is connected to the grid of tube 145. The cathode of tube 145 is connected to ground through biasing resistor 146, which in the aforesaid typical embodiment had a resistance of 2,000 ohms. The plate of tube 145 is connected to high-voltage source 114 through potentiometer 147, which in the aforesaid typical embodiment had a value of 100,000 ohms. The movable tap on potentiometer 147 is connected through coupling capacitor 148 to one terminal of the primary winding of transformer 149, the other primary terminal being grounded. In the typical embodiment heretofore referred to, capacitor 148 had a value of .01 mf.

The secondary winding of transformer 149 is center-tapped, the center tap being grounded. The secondary terminals of transformer 149 are connected respectively to the grid of tube 150 and to the grid of tube 151. The cathodes of tubes 150 and 151 are connected together and connected to ground through biasing resistor 152, which in the typical embodiment had a value of 1,000 ohms. The plates of tubes 150 and 151 are connected respectively to the primary terminals of transformer 153, the center tap of that winding being connected to high-voltage terminal 114.

The secondary winding of transformer 153 is center-tapped, the center tap being grounded. The secondary terminals of transformer 153 are connected respectively to the control grid of tube 154 and to the control grid of tube 155. The cathodes of those tubes are connected together and are connected to ground through biasing resistor 156, which, in the typical embodiment referred to, had a value of 250 ohms. The screen grids of tubes 154 and 155 are connected together and to high-voltage terminal 114, they being also by-passed to ground by capacitor 157. The capacitance of capacitor 157 was, in the aforesaid typical embodiment, .1 mf.

The plates of tubes 154 and 155 are respectively connected to the primary terminals of transformer 158, the center tap of the primary winding of transformer 158 being connected to high-voltage terminal 116. The secondary winding of transformer 158 is connected in parallel with the primary winding of transformer 112, heretofore mentioned.

It will be understood that the characteristics of the various transformers employed in the circuit will be governed by the signal frequency employed. Generally speaking, they should be designed so as to have approximately ideal characteristics for that frequency.

The specific values given in the foregoing description with respect to the various capacitors and resistors are, it is to be understood, merely for purposes of illustration. None of the values given is critical, and persons skilled in the art could readily substitute other values for those given and introduce minor variations in the circuit without affecting the operation of the apparatus as a whole. Further, it is to be borne in mind that the values given are typical for an operating frequency of 10,000 C. P. S., any many of the values, particularly those of the capacitors, would be altered if the operating frequency were greatly different from that value.

In the aforesaid typical embodiment, the tube types used were as follows: Tubes 110, 113, 124, 145, 131, 132, 150, and 151, type 6C5; tubes 135 and 136, type 6B4; tubes 154 and 155, type 6L6. It is to be understood that the tube types indicated are illustrative merely. Generally speaking, tubes 135 and 136 should be types having low dynamic plate resistance, while tubes 154 and 155 should be types having high dynamic plate resistance. With that general limitation, a person skilled in the art could substitute many other types of tubes for those indicated without adversely affecting the operaion of the apparatus.

*Operation*

In the operation of our invention, it will be understood that tubes 110 and 113 function as cathode followers, operative to isolate the two equivalent generator circuits from the input terminals of the device. The magnitude of the output voltage from cathode followers 110 and 113 will be determined respectively by the settings of the variable resistors in their respective cathode circuits.

In the voltage amplifiers which follow the respective cathode followers, we have provided phase-shifting circuits for setting at the desired value the phase of the voltage applied respectively to the grid of tube 124 and to the grid of tube 145. The voltages, thus shifted in phase, are suitably amplified by the stages which follow in the two signal channels. The phase-reversing switches 128 and 130, it will be understood, widen the available range of phase shift by permitting at will the addition of a 180° phase shift.

As will be seen from examination of Fig. 4, the signal fed to the channel commencing with cathode follower 113 is governed by the voltage applied to input terminals 101 and 102. On the other hand, the signal applied to the channel commencing with cathode follower 110 is governed by the current flowing in the line connecting input terminal 101 and output terminal 201. The output voltage of the voltage-control signal channel is connected in series with the line between the input and output terminals, while the signal fed into the current-controlled channel is amplified and applied, with a very high source impedance, in shunt with the input-output path.

As a result of the circuit arrangement just described, the lower signal channel acts as a current generator, connected across the input-output line, developing a controllable current having a predetermined phase relation to the current flowing through resistor 103. Similarly, the voltage developed across the secondary winding of transformer 104 has controllable magnitude and a predetermined phase relation to the voltage applied at input terminals 101 and 102.

Accordingly, it will be readily seen that the apparatus can be adjusted to function as a substantially perfect phase transformer.

To do so, the voltage-controlled channel should simulate, it will be recalled from Fig. 3, a voltage equal to the input voltage times $(e^{j\alpha}-1)$. As may be readily shown by complex algebra, $(e^{j\alpha}-1)$ is equal to $$\left(2\sin\frac{\alpha}{2}\right)e^{j\left(90°+\frac{\alpha}{2}\right)}$$

Therefore, to simulate a perfect phase transformer, the voltage developed across the secondary winding of transformer 104 should have a magnitude of $$2\sin\frac{\alpha}{2}$$

times the input voltage, and a phase of $$90°+\frac{\alpha}{2}$$

relative to the input voltage. A simular relationship must exist between the current in the secondary of transformer 112 and the current in resistor 103.

Since both amplitude and phase controls are provided in the two signal channels, the channels may readily be adjusted to satisfy those conditions. In practice, the apparatus may readily be adjusted by means of a voltmeter and ammeter, to measure magnitudes, and a suitable phase-indicating device such as an oscilloscope.

For convenience in adjustment of the phase-shifting circuits in the respective signal channels, resistors 121 and 142 may initially be set to zero ohms, and the resistors 122 and 143 then adjusted to give a phase shift of 90°. Additional phase shift can then be introduced by varying the resistors 121 and 142 respectively. It will of course be understood that the phase-shifting circuits in the respective signal channels will normally be adjusted to yield equal phase shifts, since a practical circuit element normally will shift the voltage and the current by an equal angle, even though the voltage and current may have any arbitrary phase relation with respect to one another. The phase-reversing switches 128 and 130, it will be realized, permit our invention to produce negative as well as positive phase transformations.

While we have herein described the operation of our invention with particular reference to its use as a pure phase transformer, it should be understood that it may be used, if desired, as a general vector transformer producing changes in both magnitude and phase of the applied voltage and current. That is, the voltage-controlled channel and the current-controlled channel may be adjusted to provide not only those complex values of inserted voltage and current which will yield a pure phase transformation but can also be adjusted to produce any desired complex transformation, involving both phase and magnitude, within wide limits. Thus our invention, in its broad aspect, is a general vector transformer.

In practice, the most extensive field of application for our invention will probably lie in the field of phase transformation, since magnitude transformation can easily be accomplished with an ordinary transformer of approximately ideal characteristics. Further, it will be understood that our invention can be used in cascade with a conventional transformer for reproducing practical circuit elements having complex transformation constants.

While we have in the foregoing description described in considerable detail the construction and operation of a typical embodiment of our invention, it should be understood that that description is purely for purposes of illustration. Persons skilled in the art can introduce many changes therein and departures therefrom without departing from the spirit of our invention. It is accordingly our desire that the scope of our invention be determined primarily with reference to the appended claims.

We claim:

1. Apparatus for effecting complex transformation of sinusoidal voltages and currents comprising input means, output means, means connected to said input means for deriving a signal controlled by the current flowing into said input means, means connected to said input means for deriving a signal controlled by the voltage applied to said input means, a first signal channel fed by said voltage-governed signal, a second signal channel fed by said current-governed signal, said first channel having a low-impedance output and said second channel having a high-impedance output, series circuit means connecting said input means and said output means comprising said low-impedance output of said first signal channel, and second circuit means connecting said high-impedance output of said second signal channel in parallel with said output means, each of said signal channels comprising means for shifting the phase of the signals passing therethrough.

2. Apparatus according to claim 1 wherein each of said signal channels comprises an amplifier and wherein means are provided for varying to any desired value within predetermined limits the amplification of said amplifier.

3. Apparatus according to claim 1 wherein each of said phase-shifting means is provided with manually adjustable means for setting to any desired angle within predetermined limits the phase shift of the signals passing therethrough.

4. Apparatus according to claim 1 wherein each of said phase-shifting means is provided with manually adjustable means for setting to any desired angle within predetermined limits the phase shift of the signals passing therethrough, and wherein each of said signal channels comprises also a phase-reversing switch for shifting by an additional 180° the phase of signals passing therethrough.

5. Apparatus for effecting complex transformation of sinusoidal voltages and currents comprising a pair of input terminals, a pair of output terminals, a coupling transformer having a low-impedance secondary winding, a low-impedance current-sampling element, circuit means connecting said input terminals to said output terminals comprising in series said current-sampling element and said low-impedance secondary winding, a second coupling transformer having a high-impedance secondary winding, said high-impedance secondary winding being connected in parallel with said output terminals, a first amplifier fed by the input voltage applied to said input terminals and having its output fed to the primary winding of said first coupling transformer, and a second amplifier fed by the potential drop across said current-sampling element and having its output fed to the primary winding of said second coupling transformer, each of said amplifiers being provided with means for shifting the phase of signals fed therethrough and having also means for controlling within predetermined limits the magnitude of signals fed therethrough.

6. Apparatus for effecting complex transformation of substantially sinusoidal voltages and currents comprising input means, output means, a voltage-insertion generator connected in series with said input and output means, and a current-insertion generator connected in shunt with said output means, said generators comprising means operative responsively to signals applied at said input means to establish predetermined amplitude and phase parameters for the voltage and current respectively generated by said generators, said voltage-insertion generator having a low-impedance output connected in series with said input and output means and said current-insertion generator having a high-impedance output connected in shunt with said output means.

7. Apparatus for effecting complex transformation of substantially sinusoidal voltages and currents comprising input means, output means, a voltage-insertion generator connected in series with said input and output means, and a current-insertion generator connected in shunt with said output means, said generators each comprising means for shifting the phase of signals applied at said input means for establishing predetermined phase relations between the voltage and current generated by said generators and appearing at said output means.

8. The apparatus of claim 7 in which each of said generators also comprises means for adjusting the amplitude of signals applied at said input means and appearing at said output means.

9. In a circuit adapted for use in the representation of a transformer and being operative to effect phase transformations in signals applied thereto, input means and output means, a pair of insertion generators, one being a voltage generator connected in series between said input and output means and the other being a current generator connected in shunt with said output means, said voltage generator being operative to provide the vector voltage difference that exists between the input and output voltages of a represented transformer resulting from a phase transformation therein, and said current generator being operative to provide the difference in current that exists between the input and output currents of a represented transformer resulting from a phase transformation therein.

10. The circuit of claim 9 in which said generators each comprise means for compensating for losses that occur in an imperfect transformer being represented.

11. The apparatus of claim 9 in which a magnitude transformer is connected in cascade with said circuit so that the magnitude and phase transformations provided respectively by said magnitude transformer and by said circuit can be synthesized to provide a vector transformation.

References Cited in the file of this patent

UNITED STATES PATENTS

| | | |
|---|---|---|
| 2,288,740 | Peterson | July 7, 1942 |
| 2,436,882 | Odessey | Mar. 2, 1948 |
| 2,591,955 | Mak et al. | Apr. 8, 1952 |